Aug. 17, 1926.
L. C. ROGERS
1,596,766
WINDSHIELD ATTACHMENT
Filed Nov. 16, 1925
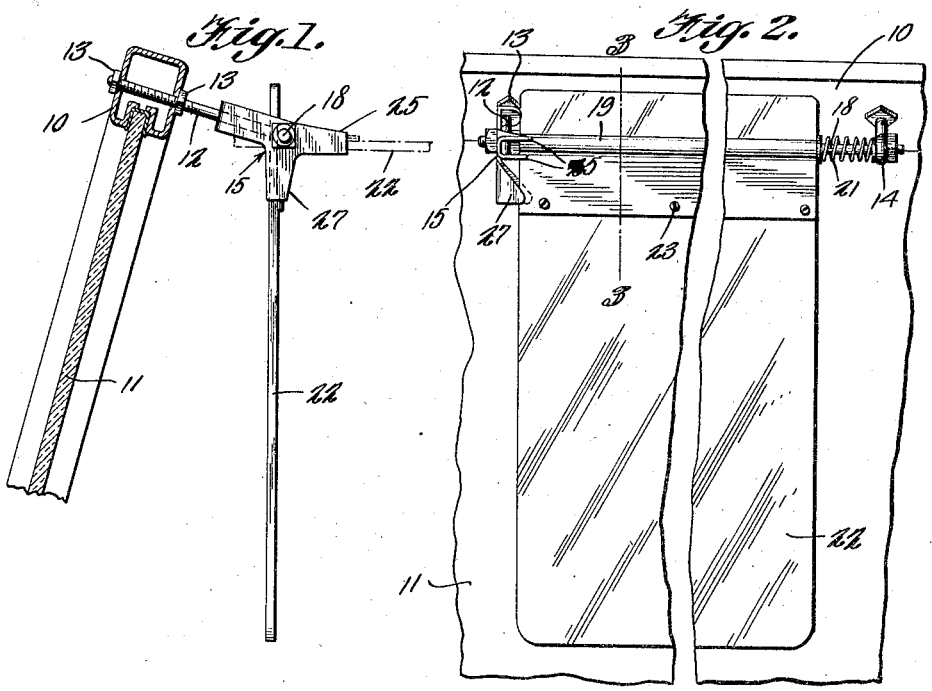
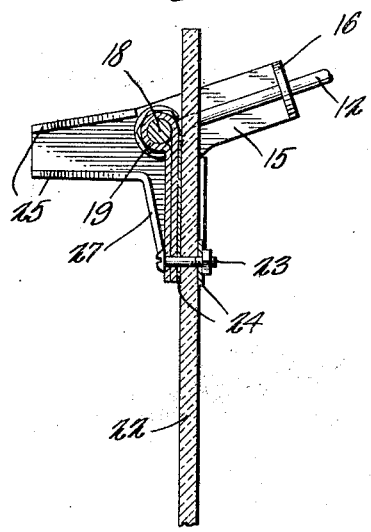
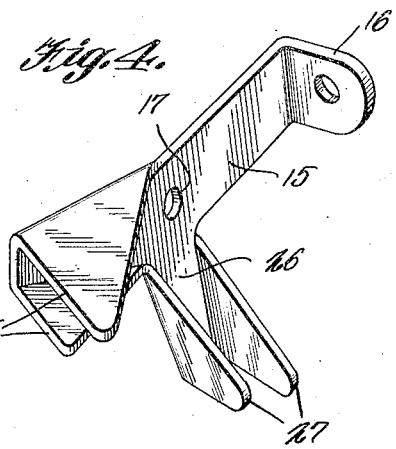
Lyman C. Rogers, INVENTOR
BY Victor J. Evans ATTORNEY
WITNESS:

Patented Aug. 17, 1926.

1,596,766

UNITED STATES PATENT OFFICE.

LYMAN C. ROGERS, OF PINCKNEY, MICHIGAN.

WINDSHIELD ATTACHMENT.

Application filed November 16, 1925. Serial No. 69,465.

This invention relates to improvements in attachments to be readily applied upon the windshield and other portions of motor vehicles for softening the rays of sunlight and the blinding effect of motor vehicle headlights whereby the driver and other occupants of the vehicle may not be annoyed.

Another object of my invention resides in the construction and provision of the attachment per se constituting means for securing the attachment in place upon an appropriate portion of the motor vehicle in order that a plate of glass or other transparent material may be mounted for swinging movement thereon which rigidly retains the latter at a desired position.

With the above and other objects in view, the invention further includes the following novel features and details of construction, to be hereinafter more fully described, illustrated in the accompanying drawings and pointed out in the appended claims.

In the drawing:—

Figure 1 is a sectional view taken through a motor vehicle windshield and illustrating the manner in which my invention is associated therewith.

Figure 2 is a fragmentary elevation of my invention as applied.

Figure 3 is a sectional view taken through the holding means for the glass.

Figure 4 is a detail perspective of the holding means per se.

Referring to the drawing in detail, wherein like characters of reference denote corresponding parts, the reference character 10 indicates the motor vehicle windshield frame and 11 the glass therefor, all of the above being of the usual and well known construction and forming no part of the present application for Letters Patent but being merely shown for purposes of illustration in bringing forward the novel advantages of the above entitled invention.

The invention resides in the provision of a pair of bolts 12 having forwardly extending tapered ends extending within the windshield frame 10 or glass 11 the appropriate distances and having jam nuts 13 positioned thereon upon the opposite sides and engaging the corresponding sides of the windshield frame 10 or glass 11 whereby the bolts 12 will be held against retrograde movement and accidental displacement. The inner ends of the bolts 12 terminate in looped ends 14.

A locking member constituting a plate 15 has an offset and apertured end portion 16 receiving one of the bolts 12 therethrough while an additional opening 17 provided at an appropriate point in the length of the plate 15 and in registration with the looped end of the corresponding bolt 12 permits the insertion of a bolt 18 therethrough which extends to the corresponding looped portion 14 of the remaining bolt 12. The bolt 18 also extends through a cylindrical portion 19 formed intermediate the length of a plate 20 while a compression spring 21 encircles the bolt 18 and has an engaging washer arranged adjacent to opposite ends forcing the plate 20 toward one end of the bolt 18; the purpose of which will be presently apparent.

A plate of stained or colored glass or other transparent material as indicated at 22 is secured as indicated at 23 to the inner side of the plate 20 while resilient facings 24, preferably rubber, are arranged upon the opposite sides of the plate 22 adjacent the plate 20 and securing means 23 whereby the said plate of glass or transparent material 22 is prevented from cracking when so positioned. The inner end of the plate 15 terminates in inwardly extending spaced parallel ears 25, sufficiently spaced apart to permit the insertion of one side edge of the plate 20 and plate of glass or transparent material 22. A downwardly extending portion 26 provided upon the plate 15 has inwardly extending spaced parallel ears 27 in order that the said plate of glass or transparent material 22 may be also held in a vertical position for use.

In the use and operation of the present invention it is clearly apparent and manifest that the plate of glass or transparent material 22 is normally positioned for use between the ears 27, in the instance of the device being secured upon a motor vehicle windshield frame 10 or glass 11, in order that the blinding effect of the headlights upon approaching vehicles will be obliterated and by the same token the plate of glass or transparent material 22 may also be swung in a like manner and positioned between the ears 25 in an inactive position.

The construction of the above entitled invention is such as to permit its manufacture in great numbers and its ultimate demand at a very low cost.

The invention is susceptible of various changes in its proportions and minor details of construction, and the right is herein reserved to make such changes as properly fall within the scope of the appended claims.

Having thus described the invention, what is claimed is:—

1. A windshield attachment for use upon motor vehicles comprising a pair of spaced parallel bolts having their forward ends secured at appropriate points in the length of the windshield frame and terminating at their inner ends in looped portions, a relatively long bolt having its opposite ends secured within the looped portions of the bolts, a plate bent intermediate upon itself in forming a cylindrical portion for the reception of the elongated bolt therethrough, an anti-glare plate secured to the plate, a compression spring encircled upon one end of the elongated bolt and forcing the plate and anti-glare plate to the opposite end of the said bolt, a locking plate providing a substantially offset and apertured forward end receiving one of the first mentioned bolts therethrough and a corresponding end of the elongated bolt, and spaced parallel ears extending inwardly and downwardly upon the locking plate for the reception of the corresponding side edges of the plate and anti-glare plate for rigidly retaining the latter in operative and inoperative positions thereon.

2. A windshield attachment for use upon motor vehicles comprising a pair of spaced parallel bolts having their forward ends secured at appropriate points in the length of the windshield frame and terminating at their inner ends in looped portions, a relatively long bolt having its opposite ends secured within the looped portions of the bolts, a plate bent intermediate upon itself in forming a cylindrical portion for the reception of the elongated bolt therethrough, an anti-glare plate secured to the plate, a compression spring encircled upon one end of the elongated bolt and forcing the plate and anti-glare plate to the opposite end of the said bolt, a locking plate providing a substantially offset and apertured forward end receiving one of the first mentioned bolts therethrough and a corresponding end of the elongated bolt, and oppositely disposed spaced parallel ears extending inwardly and downwardly upon the locking plate in juxtaposition to the side edges of the anti-glare plate when swung to operative and inoperative positions and to rigidly hold the latter in the desired position.

In testimony whereof I affix my signature.

LYMAN C. ROGERS.